United States Patent [19]
Iida

[11] Patent Number: 5,587,897
[45] Date of Patent: Dec. 24, 1996

[54] OPTIMIZATION DEVICE

[75] Inventor: Kazuhiro Iida, Tokyo, Japan

[73] Assignee: NEC Corporation, Tokyo, Japan

[21] Appl. No.: 364,173

[22] Filed: Dec. 27, 1994

[30] Foreign Application Priority Data

Dec. 27, 1993 [JP] Japan .................... 5-330341

[51] Int. Cl.$^6$ ............................ G05B 13/02; G05B 13/04
[52] U.S. Cl. ...................... 364/148; 364/149; 364/150; 364/153
[58] Field of Search ........................... 364/148, 149, 364/152, 402, 754, 153, 150

[56] References Cited

U.S. PATENT DOCUMENTS

| | | | |
|---|---|---|---|
| 4,208,712 | 6/1980 | Deutsch | 364/156 |
| 4,744,027 | 5/1988 | Bayer et al. | 364/402 |
| 4,744,028 | 5/1988 | Karmarkar | 364/402 |
| 4,894,773 | 1/1990 | Lagarias | 364/402 |
| 4,914,563 | 4/1990 | Karmarkar et al. | 364/148 |
| 5,107,452 | 4/1992 | Karmarkar | 364/754 |
| 5,136,538 | 8/1992 | Karmarkar et al. | 364/754 |

FOREIGN PATENT DOCUMENTS

| | | |
|---|---|---|
| 59-83207 | 5/1984 | Japan . |
| 64-29912 | 1/1989 | Japan . |
| 1-28313 | 6/1989 | Japan . |
| 3-210685 | 9/1991 | Japan . |
| 4-288662 | 10/1992 | Japan . |

OTHER PUBLICATIONS

Konno et al., "Nonlinear Programming", Nikkagiren, 1979.
Kirkpatrick et al., "Optimization by Simulated Annealing", Science, vol. 220, 1983, pp. 671–680.
Akaike et al., "Statistical Analysis and Control of Dynamic System", Science Inc., 1972, ISBN 4–7819–0252–7.

*Primary Examiner*—Paul P. Gordon
*Attorney, Agent, or Firm*—Foley & Lardner

[57] ABSTRACT

An optimization device comprising a function for inputting an objective function to be optimized, a required precision required for optimizing and a search region for the optimal solution to make the objective function into a convex function, a function for inputting the convex objective function to start the search of the optimal solution from the search region of the optimal solution, and a function for detecting the optimal solution based on the detected search start point.

18 Claims, 6 Drawing Sheets

OPTIMIZATION DEVICE

BACKGROUNDS OF THE INVENTION

1. Field of the Invention

This invention relates to an optimization device which is used to realize various controls, optimization of designs, and application of physical models to observed values, and particularly to an optimization device which specifies a search region of optimal solution to guarantee precise optimization.

2. Description of the Related Art

Optimization technology has been used extensively to acquire an optimum physical model for an observed value, to classify and predict using the above physical model, to determine charging amounts of chemical materials and various adjusting levels for making optimum control of a chemical reaction, and to realize an optimum design of a plant meeting various limited conditions.

An optimization device for carrying out the above optimization technology replaces physical control parameters such as a physical quantity in applying the physical model, a chemical charging amount in controlling the chemical reaction, and a gas flow rate in designing the plant with objective functions for checking the acceptability of fitting the physical model, and minimizes or maximizes the objective functions under prescribed limited conditions to provide optimal physical control parameters. As to specific means for configuring objective functions by using parameters, "Nonlinear Programming" (by Hiroshi Konno and Hiroshi Yamashita, published by Nikkagiren, 1979) discloses techniques to use them to solve a problem of maximizing a profit in a range of available resource quantity in the production plan, an equilibrium price problem in mathematical economics, and a problem of minimizing a construction cost of a reactor core which meets prescribed critical conditions in designing the core.

The optimization device has been actually incorporated into various systems and yielded practical results. For example, Japanese Patent Publication No. 1-28313 entitled "Oxygen Plant Operation Method" discloses a technology for realizing energy saving and cost reduction in operating an oxygen production plant using an optimization device for optimizing an objective function with an electric energy and a yield of liquid oxygen as parameter. And, Japanese Patent Application Laying-open No. H1-29912 entitled "Fluid Processing System" discloses a technology to control a chemical reaction by determining the set values of an optimal salt concentration and an optimal pH value in the absorptive removal device at a chemical reaction plant.

But, conventional optimization devices have a disadvantage that a desired precision cannot be always obtained. Specifically, an objective function generally has a plurality of minimum solutions and maximum solutions which do not always meet an objective precision, but the conventional optimization devices or coventional local search methods, such as the conjugate gradient method, which is described in "Nonliner Programming: Analysis and methods, Mordecai Avriel ed., Series in Automatic Computation, Prentice-Hall, 1976", look for a point that a first order differential coefficient is 0 based on a local search result, so that such minimum solutions or maximum solutions are detected depending on a way of selecting a point for starting the search, and the objective precision may not be obtained.

To remedy the above disadvantages, for example, Japanese Patent Application Laying-open No. S59-83207 entitled "Optimal Control Method" discloses a technology to position a search starting point for optimizing at a place which is presumed to include an optimal solution based on the knowledge and experience of a control engineer.

Specifically, the above Japanese Patent Application Laying-open Print discloses as follows. "This invention is to determine a search starting point in this existence region. For example, when an energy supply source is a plurality of steam turbines, these steam turbines are provided with a main steam control valve and an extraction control valve, and it is known from the knowledge and experience that a loss due to the openings of the main steam control valves and the extraction control valves is zero. Therefore, in supplying energy required by a production process, it is not necessary to determine a loss when the main steam control valves and the extraction control valves are successively opened, and it can be easily determined according to the required energy that the valves shall be fully opened to which ones. By previously determining the number of valves which must be fully opened or completely closed, which condition is determined to be a search starting point, a desired optimal solution can be obtained in a short search time." Thus, the experience and knowledge of the control engineer are used to obtain the desired optimal solution in a short time. The method of the above Print is an excellent method in the sense that the knowledge of the engineer involved in the control on site for a long period is used for optimization, and can shorten a time actually required for optimal control of the steam turbines. Thus, it is expected to obtain a better solution than when this method is not used.

But, the above method has a disadvantage that it cannot be used when a control engineer with experience and knowledge is not available. And, even if a search starting point is selected based on experience and knowledge, the obtained solution does not always meet a desired precision.

To meet an objective precision for optimization, Japanese Patent Application Laying-open No. H3-210685 entitled "Neuro Circuit Device" discloses a technology, with a combined weight of model neuro circuits as parameter, for optimizing them. This device groups neuro elements to give redundancy, thereby shortening a time required for optimization and improving the probability of obtaining a global optimum, or a solution that a value of the objective function is smaller than any point in the search region.

Furthermore, Japanese Patent Application Laying-open No. H4-288662 entitled "Method for training Neural Network System" discloses to use a prescribed genetic algorithms to combine the structure of a model neuro circuit with a studying method of neural network system, thereby realizing the speed up of training and the convergence on a global optimum.

But, Japanese Patent Application Laying-open No. H3-210685 entitled "Neuro Circuit Device", Japanese Patent Application Laying-open No. H4-288662 entitled "Method for training Neural Network System" and other similar devices can improve the probability of converging on a global optimum, but it is not guaranteed that they do not fail to converge on a global optimum, and a desired precise solution cannot be always obtained.

And, another attempt is described in "Science, Vol. 220 (1983), pp 671 to 680". It describes a technology to give stochastic fluctuation to a search point to be able to overcome a difficulty present in the objective function, and to gradually decrease the fluctuation to direct the search point to a global optimum. But, the above technology has a difficulty in controlling the magnitude of the fluctuation and cannot always obtain a global optimum.

Thus, the conventional optimization devices do not always obtain a desired precise solution, and it is particularly difficult to obtain a global optimum which is the most appropriate solution in a total search space.

And, since it was not guaranteed that a solution meeting a required precision is obtained, it was difficult to determine a countermeasure in case of failing to obtain a required precision. Specifically, when a required precision could not be obtained, there was a disadvantage that identification could not be made if it was originally impossible to meet the required precision because the system structure itself was inferior, the convergence on a global optimum could not be made because a search starting point was not appropriate though there was a solution meeting the required precision, or the desired precise solution could not be obtained because the optimization device had an error.

SUMMARY OF THE INVENTION

A first object of the invention is to provide an optimization device which can judge the presence or not of an optimal solution meeting a required precision even when a search is started from any point in a search region.

In addition to the above object, a second object of the invention is, when there is a solution meeting a required precision, to provide an optimization device which can obtain an optimal solution meeting the required precision.

In addition to the above objects, a third object of the invention is to provide an optimization device which can determine a global optimum.

According to one aspect of the invention, an optimization device comprising:

means for inputting an objective function which includes a parameter to be optimized and is an object for searching an optimal solution, a required precision indicating a precision required in searching the optimal solution and a search region for searching the optimal solution for the objective function to make said objective function into a convex function; and means for inputting said objective function made into the convex function to detect a search start point for starting the search of the optimal solution from said search region of the optimal solution.

In the preferred construction, the means for making said objective function into the convex function comprising;

means for having a very large value only at a point where a solution of said objective function is equal to said required precision and for making a prescribed function having a sufficiently small value at other points, and means for giving a diffusing operation to said prescribed function to make the convex objective function.

Also, the means for detecting the search start point comprising;

means for determining a maximum value in said search region from the solutions of said convex objective function, means for detecting the position of a point having the maximum value of said convex objective function, and means, when said determined convex objective function value is equal to or above a prescribed threshold value and the point having said maximum value is within the search region, for outputting said point as a search start point.

According to another aspect of the invention, an optimization device comprising:

means for inputting an objective function which includes a parameter to be optimized and is an object for searching an optimal solution, a required precision indicating a precision required in searching the optimal solution and a search region for searching the optimal solution for the objective function to make said objective function into a convex function;

means for inputting said convex objective function to detect a search start point for starting the search of the optimal solution from said search region of the optimal solution; and means for detecting the optimal solution based on the detected search start point.

In the preferred construction, the said means for making said objective function into the convex function comprising;

means for having a very large value only at a point where a solution of said objective function is equal to said required precision and for making a prescribed function having a sufficiently small value at other points, and means for giving a diffusing operation to said prescribed function to make the convex objective function.

Also, the means for detecting the search start point comprising;

means for determining a maximum value in said search region from the solutions of said convex objective function, means for detecting the position of a point having the maximum value of said convex objective function, and means, when said determined convex objective function value is equal to or above a prescribed threshold value and the point having said maximum value is within the search region, for outputting a point on said objective function corresponding to said point as a search start point.

Also, the means for detecting the optimal solution comprising;

means for inputting said objective function, for starting to calculate a value of said objective function from said search start point, and for determining a maximum value or a minimum value in said search region from the solutions of said objective function, means for detecting the position of a point having the maximum value or the minimum value of said objective function, and means, when the point having said maximum value or a minimum value is within the search region, for outputting said point as an optimal solution.

According to a further aspect of the invention, an optimization device comprising:

means for inputting an objective function which includes a parameter to be optimized and is an object for searching an optimal solution, a required precision indicating a precision required in searching the optimal solution and a search region for searching the optimal solution for the objective function to make said objective function into a convex function;

means for inputting said convex objective function to detect a search start point for starting the search of the optimal solution from said search region of the optimal solution; and means for detecting a global optimum based on the detected search start point.

In the above-mentioned construction, the means for making said objective function into the convex function comprising;

means for having a very large value only at a point where a solution of said objective function is equal to said required precision and for making a prescribed function having a sufficiently small value at other points, and means for giving a diffusing operation to said prescribed function to make the convex objective function.

In the above-mentioned construction, the means for detecting the search start point comprising;

means for determining a maximum value in said search region from the solutions of said convex objective function, means for detecting the position of a point having the maximum value of said convex objective function, and means, when said determined convex objective function value is equal to or above a prescribed threshold value and the point having said maximum value is within the search region, for outputting said point as a search start point.

In this case, the means for detecting a global optimum comprising;

means for entering said objective function and starting to calculate a value of said objective function from said search start point to determine a maximum value or a minimum value in said search region from the solutions of said objective function, means for detecting the position of a point having a maximum value or a minimum value of said objective function, means for outputting said point as an optimal solution when a point having a maximum value or a minimum value of said objective function is within the search region, means for repeatedly searching the optimal solution by decreasing a value of said required precision when said optimal solution conforming to said required precision given initially is present, and means for outputting as the global optimum said optimal solution conforming to said required precision immediately before said optimal solution is eliminated.

In the above-mentioned construction, the said means for making said objective function into the convex function comprising;

means for having a very large value only at a point where a solution of said objective function is equal to said required precision and for making a prescribed function having a sufficiently small value at other points, and means for giving a diffusing operation to said prescribed function to make said objective function into the convex function, the means for detecting the search start point comprising;

means for determining a maximum value in said search region from the solutions of said objective function made into the convex function, means for detecting the position of a point having the maximum value of said objective function made into the convex function, and means, when said determined objective function value made into the convex function is equal to or above a prescribed threshold value and the point having said maximum value is within the search region, for outputting said point as a search start point, and the means for detecting the global optimum comprising;

means for entering said objective function and starting to calculate a value of said objective function from said search start point to determine a maximum value or a minimum value in said search region from the solutions of said objective function, means for detecting the position of a point having a maximum value or a minimum value of said objective function, means for outputting said point as an optimal solution when a point having a maximum value or a minimum value of said objective function is within the search region, means for repeatedly searching the optimal solution by increasing a value of said required precision when said optimal solution conforming to said required precision given initially is not present, and means for outputting as the global optimum said optimal solution conforming to said required precision detecting said optimal solution for the first time.

According to a still further aspect of the invention, an optimization method comprising:

a step for inputting an objective function which includes a parameter to be optimized and is an object for searching an optimal solution, a required precision indicating a precision required in searching the optimal solution and a search region for searching the optimal solution for the objective function to make said objective function into a convex function;

a step for inputting said convex objective function to detect a search start point for starting the search of the optimal solution from said search region of the optimal solution, and a step for detecting the optimal solution based on the detected search start point.

In this case, the step for making said objective function into the convex function including;

a step for having a very large value only at a point where a solution of said objective function is equal to said required precision and for making a prescribed function having a sufficiently small value at other points, and a step for giving a diffusing operation to said prescribed function to make the convex objective function, said step for detecting the search start point including;

a step for determining a maximum value in said search region from the solutions of said convex objective function, a step for detecting the position of a point having the maximum value of said convex objective function, and a step, when said determined convex objective function value is equal to or above a prescribed threshold value and the point having said maximum value is within the search region, for outputting said point as a search start point.

Also, the step for detecting the optimal solution including;

a step for inputting said objective function, for starting to calculate a value of said objective function from said search start point, and for determining a maximum value or a minimum value in said search region from the solutions of said objective function, a step for detecting the position of a point having the maximum value or the minimum value of said objective function, and a step, when the point having said maximum value or a minimum value is within the search region, for outputting said point as an optimal solution.

Other objects, characteristics and effects of the invention will be obvious from the following detailed description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

This invention will be described in detail in preferred embodiments with reference to the attached drawings.

The optimization device generally configures an objective function for checking the acceptability of fitting and controlling of a physical model by expressing in a numerical value a physical control parameter to be optimized, thereby obtaining the best physical control parameter (solution) to minimize or maximize the above objective function. Therefore, any device which minimizes or maximizes a given objective function can be applied to various problems such as fitting of a physical model to an observed value and a production plan, classification and anticipation using the above physical model, optimal control of a chemical reaction, and optimal design of a plant. As specific means for configuring an objective function using a parameter, conventionally used various means can be used.

Application of the optimization device will be described taking as examples the fitting of a physical model to an observed value and the classification and anticipation using the obtained result.

The fitting of a physical model to an observed value is, in other words, to determine a value of the physical control parameter so that a certain physical model containing the physical control parameter whose specific value is not known can describe an actual observed value as well as possible. Determination of the specific value of the parameter means the acquirement of a model which exactly describes an actual phenomenon. Therefore, the model which exactly describes an actual phenomenon can be used to predict a future change of the actual observed value. And, this model can be used to predict how other parameters are when a certain observed value is obtained, so that it can be used to classify and judge the above observed value.

Now, a certain physical model, Y=f(X, A), will be considered, where "Y" is a first physical quantity, "X" a second physical quantity, "A" a third physical quantity to be optimized, and f(X, A) a relational expression indicating the model.

For example, in a case of the simplest physical model assuming that a power supply quantity to an electric furnace is "X", a temperature of the electric furnace is "Y", they are proportional to each other, and their proportional coefficient is an effective specific heat "A" of the furnace, the physical model is expressed as Y=AX. Even in this simple case, it is important to determine "A" to control "Y" by "X" because the in-furnace temperature with respect to the power supply may be generated with a large time difference.

When strings (X1, Y1), (X2, Y2), (X3, Y3) and (XN, YN) of N observed results are given, an optimum physical model Y=f(X, A*) is obtained if a specific heat A* which describes the observed results strings very well is obtained. In other words, the specific heat A* is the optimal solution for this physical model. In this case, an objective function F(A) can be expressed by the following numerical formula when a square error is adopted as the objective function indicating a poor application of the physical model.

$$F(A) = \sum_{i=1}^{N} \{Yi - f(Xi,A)\}^2$$

And, the optimal solution A* can be obtained by searching A which minimizes the objective function F(A).

For example, it is assumed that to make another electric furnace in a plant it is necessary to set a prescribed threshold value to a value of the in-furnace temperature "Y", and to select a value of the power supply quantity "X" so that the in-furnace temperature "Y" becomes larger than the threshold value. In this case, when the effective specific heat "A" of the furnace is determined by fitting the physical model, it can be judged if the power capacity of a certain distribution panel is sufficient to hold the in-furnace temperature "Y" above the threshold value.

And, when observation strings are given in time series (t1, Y1), (t2, Y2), and (tN, YN) with "t" as time to consider a physical model Y=f(t, A), the value "Y" at the prescribed time t can be predicted by using a physical model Y=f(t, A*) by an optimized parameter A*.

Thus, fitting of the physical model for obtaining a physical model, which most exactly describes the observed result by optimizing the parameter, can be used for predicting or classifying the observed value.

Fitting of a physical model is specifically exemplified in "Statistical Analysis and Control of Dynamic System" (by Hirotsugu Akaike and Toichiro Nakagawa, published by Science Inc., 1972), which describes examples of fitting a physical model by the optimization device for optimal control of a cement kiln and predicting and classifying by the above physical model.

The following embodiments of the optimization device of the invention realize to detect an optimal solution quickly and precisely by the optimization device used as described above. The following embodiments can be realized by using a computer such as workstation and a numerical controller or the like connected thereto.

Figure 1:
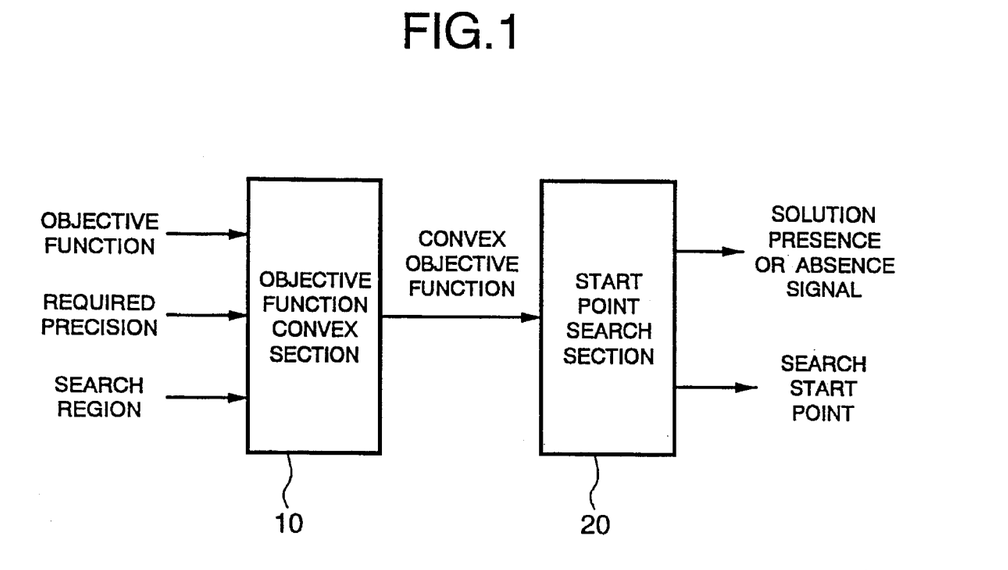
FIG. 1 is a block diagram showing the structure of an optimization device according to the first embodiment of the invention.

FIG. 1 is a block diagram showing the structure of an optimization device according to the first embodiment of the invention.

The drawing shows that the optimization device of this embodiment is provided with an objective function convex section 10 for making an objective function to be optimized into a convex function, and a start point search section 20 for searching to detect a search start point for starting the search of an optimal solution for the objective function. The drawing shows only a structure for detecting the search start point to search the optimal solution, which is a characteristic structure of this embodiment. It is to be understood that a structure for detecting the optimal solution or global optimum based on the detected search start point is actually provided.

The objective function convex section 10 inputs an objective function to be optimized, precision (hereinafter referred to as required precision) required for optimization, and a search region of an optimal solution on the objective function, then makes the inputted objective function into a convex function. And, the objective function made into the convex function (hereinafter referred to as convex objective function) is outputted to the start point search section 20 together with the inputted search region. This objective function convex section 10 is realized by a CPU or the like of the workstation.

In this case, when a vector of the parameter to be optimized is A, the objective function is given as a variable vector representing A and a memory group representing a calculation procedure for determining an objective function F(A). When an optimal solution is determined by maximizing the objective function F(A), the required precision is a lower limit value of a solution of the allowable objective function F(A), and when an optimal solution is determined by minimizing the objective function F(A), the required precision is an upper limit value of a solution of the allowable objective function F(A). For example, when F(A) is required to be equal to or smaller than 0.01 to minimize the objective function F(A), the required precision is given as a memory to express 0.01. A case for determining an optimal solution by minimizing the objective function F(A) to make it simple will be described. But, it is to be understood that the processing technology is not different to determine an optimal solution by maximizing the objective function F(A). The search region is given as a memory group showing an upper limit value Si and a lower limit value Li (i is an element number of the vetor A) in the range for searching an optimal solution.

And, the convex function is a function which is determined as follows.

First, when the required precision is "$\epsilon$", a function "G", which has a very large numeral H only at a point where the value of F(A)-$\epsilon$ is 0 and has a value close to almost 0 as compared with the "h" at another point, is considered. Then, supposing the value of the function "G" as concentration distribution, when this distribution is diffused, distribution to be obtained forms a convex with a point that R(A)-$\epsilon$ becomes 0 as the peak. In an actual diffusing phenomenon, the peak has its height lowered gradually, so that a diffusing operation is made to prevent the height of the peak of "G" from lowering. Thus, even when a local search for the maximum value is started from any point in the search region, a convex function, or convex objective function H(A), is obtained in the sense of reaching a point of F(A)-$\epsilon$=0 or its immediate vicinity.

In this case, the function G is expressed by the following formula.

$$\frac{1}{(f(A) - \epsilon)^2 + B} \quad (1)$$

B is a coefficient for determining the height h of the peak, and generally be a small numerical value of about the minus 50th power of 10. The numerical formula (1) is a mere example, and various functions which have a very large value only at a point where the value of F(A)-$\epsilon$ is 0 and a value small enough at another point can be adopted.

When "A" is a K dimension vector, and the upper and lower limit values of the search region A are Si and Li (i is an element number of A and the maximum value K) respectively, the diffusing operation to prevent the height of the peak from lowering can be realized by the following formula for example.

$$\int_{L1}^{S1} \cdots \int_{LK}^{SK} \frac{1}{\{(f(\xi) - \epsilon)^2 + B\}\{a\|A - \xi\|^2 + 1\}} d\xi_1 \ldots d\xi_K \quad (2)$$

The search region is, for example, an input range of the numerical controller corresponding to the opening of a valve. The numerical formula 2 represents a result of the diffusion that the peak height does not lower from each point on the G. A letter "a" represents a numerical value corresponding to a diffusion coefficient and is generally determined to be a value of about 0.5. A letter $\xi$ is a K dimension vector variable on the search region. When the objective function F(A) is differentiable, a power series expansion formula is used to integrate. Thus, an appropriate expansion degree (e.g., 10) is determined, so that determination can be made by a relatively simple analyzing procedure. When the objective function is not differentiable, numerical integration can be used. The above diffusing operation is a mere example, and other various diffusing operations can be used.

The start point search section 20 inputs a convex objective function from the objective function convex section 10 to search a point that a value of the convex objective function becomes a maximum value from a prescribed point in the search region by a local search method. And, when the above point is detected, the detected point is outputted as a search start point for searching an optimal solution for the objective function if a value (i.e., a maximum value) of the convex objective function at the detection point is over a prescribed threshold value and the detection point is positioned in the search region. This start point search section 20 is realized by a CPU or the like of the workstation.

According to the above example using the numerical formula (2) as the convex objective function, if the search region has even one optimal solution A* meeting F(A)$\leq\epsilon$ for the objective function F(A), a convex objective function H(A) has at least one peak whose height is h or more. Therefore, when a point detected by searching a maximum value with respect to the convex objective function H(A) is present outside of the search region, or though it is present in the search region, a value of the convex objective function H(A) at the detected point is less than h, it is said that a solution meeting F(A)$\leq\epsilon$ for the objective function F(A) does not exist.

Conversely, when a point that a value of the convex objective function H(A) at the detected point is h or more is detected, a point on the objective function F(A) corresponding to the above point is the optimal solution A* or a point very close to it, so that the optimal solution A* can be obtained quickly by starting to search a minimum value of the objective function F(A) from that point.

Figure 2:
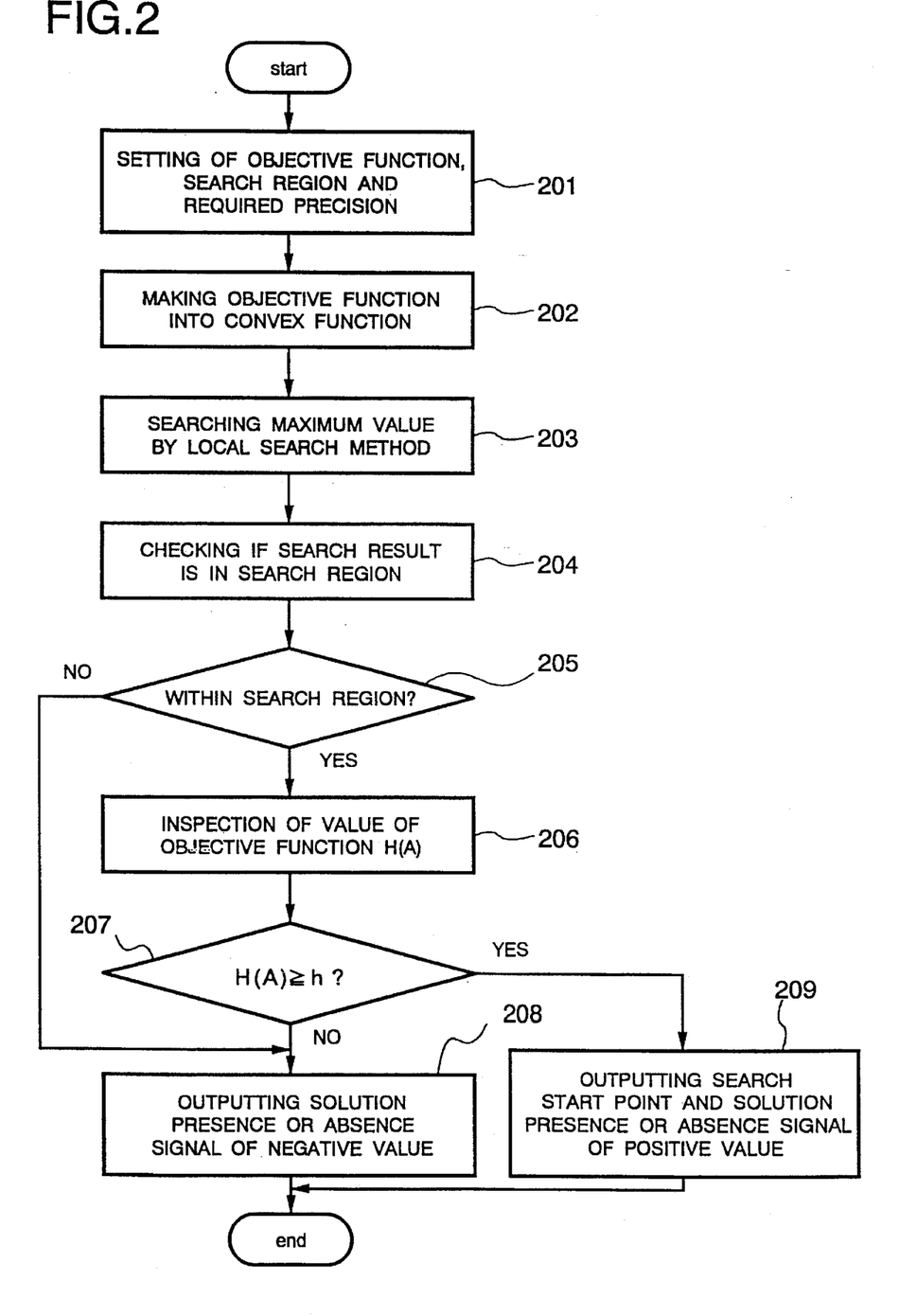
FIG. 2 is a flowchart showing the operation of the first embodiment.

Now, the operation of this embodiment will be described with reference to the flowchart of FIG. 2.

First, the objective function F(A), the required precision and the search region are inputted in the objective function convex section 10 (step 201). The objective function convex section 10 converts the inputted objective function F(A) into a memory group expressing the convex objective function H(A) of the aforementioned numerical formula 2 or the like (step 202); then given to the start point search section 20 together with the memory group expressing the search region.

The start point search section 20 inputs the convex objective function H(A) and the search region from the objective function convex section 10 to search a point that a solution of the convex objective function H(A) becomes a maximum value (step 203). After detecting a point that a solution of the convex objective function H(A) becomes a maximum value, a value of the convex objective function H(A) at that point is determined when the above point is within the search region (steps 204, 205 and 206). When the detected value is less than h (when B is the minus 50th power of 10, the plus 50th power of 10) or the detected point is present outside of the search region, a negative numerical value indicating no existence of an optimal solution is outputted as a solution presence or absence signal (steps 207, 208). On the other hand, when the detected value of the convex objective function H(A) is h or more and the above point is within the search region, a positive numerical value indicating the presence of an optimal solution is outputted as the solution presence or absence signal and, at the same time, a memory expressing the detected point is outputted as the search start point (steps 207, 209).

Accordingly, when the solution presence or absence signal is a negative value, it can be seen that the set search region does not include a solution meeting the required precision and, when the solution presence or absence signal is a positive value, a point that the search of a solution meeting the required precision should be started can be obtained. Therefore, by providing this embodiment with a structure that the solution presence or absence signal is judged for positive or negative and, if negative, the solution presence or absence signal for a negative value is outputted; and if positive, the optimal solution A* of the objective function F(A) is searched with the search start point as a start position and outputted together with the solution presence or absence signal for a positive value, thus an optimal solution meeting the required precision can be detected surely and quickly.

In the start point search section 20, the search of a point that a value of the convex objective function becomes a maximum value can be started from a point obtained by a method of designating or the like using random numbers within the search region inputted from the objective function convex section 10. And, as a local search method for searching the above point, a conventional method such as the conjugate gradient method can be used.

Figure 3:
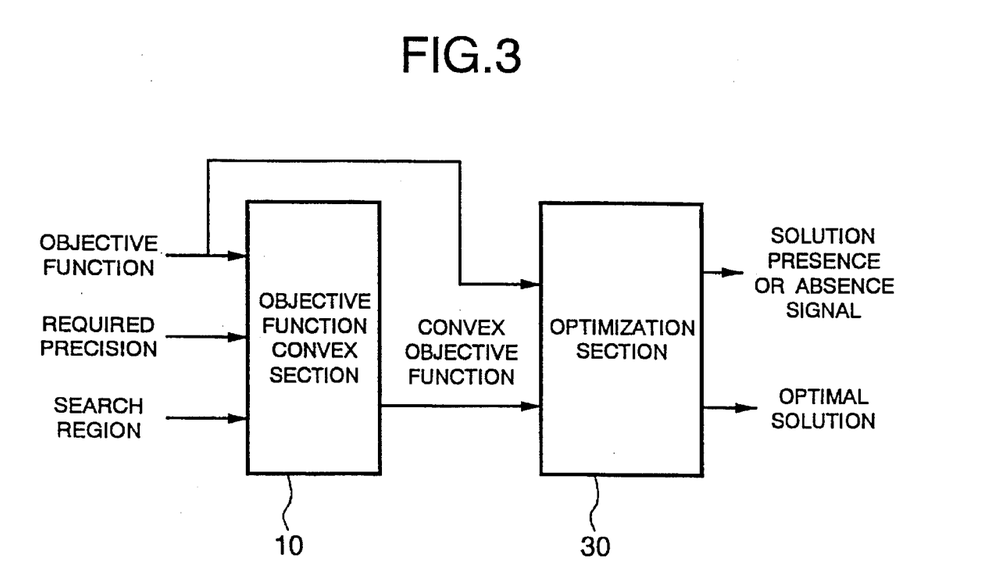
FIG. 3 is a block diagram showing the structure of an optimization device according to the second embodiment of the invention.

FIG. 3 is a block diagram showing a structure of the optimization device according to the second embodiment of the invention.

The drawing shows that the optimization device of this embodiment is provided with an objective function convex section 10 for making an objective function to be optimized into a convex function, and an optimization section 30 for searching and detecting an optimal solution for the objective function.

Since the objective function convex section 10 is same with the objective function convex section 10 in the first embodiment shown in FIG. 1, the same reference numeral is used and its description is omitted.

The optimization section 30 inputs an objective function and also enters a convex objective function from the objective function convex section 10 to detect first a search start point in the same way as the start point search section 20 of the first embodiment. And, an optimal solution for the objective function is searched and detected based on the detected search start point. The optimization section 30 is realized by a CPU or the like of the workstation.

The search start point obtained in the first embodiment is close to an optimal solution A* meeting $F(A) \leq \epsilon$ for the objective function F(A) to be optimized. When a solution meeting $F(A) \leq \epsilon$ is searched from the above search start point by a prescribed local search method, a point detected is the optimal solution A* meeting $F(A) \leq \epsilon$. Therefore, the optimal solution A* can be obtained quickly by virtue of a function of searching and detecting the search start point and a function of starting the search of the optimal solution from a point on the objective function F(A) corresponding to the detected search start point.

Figure 4:
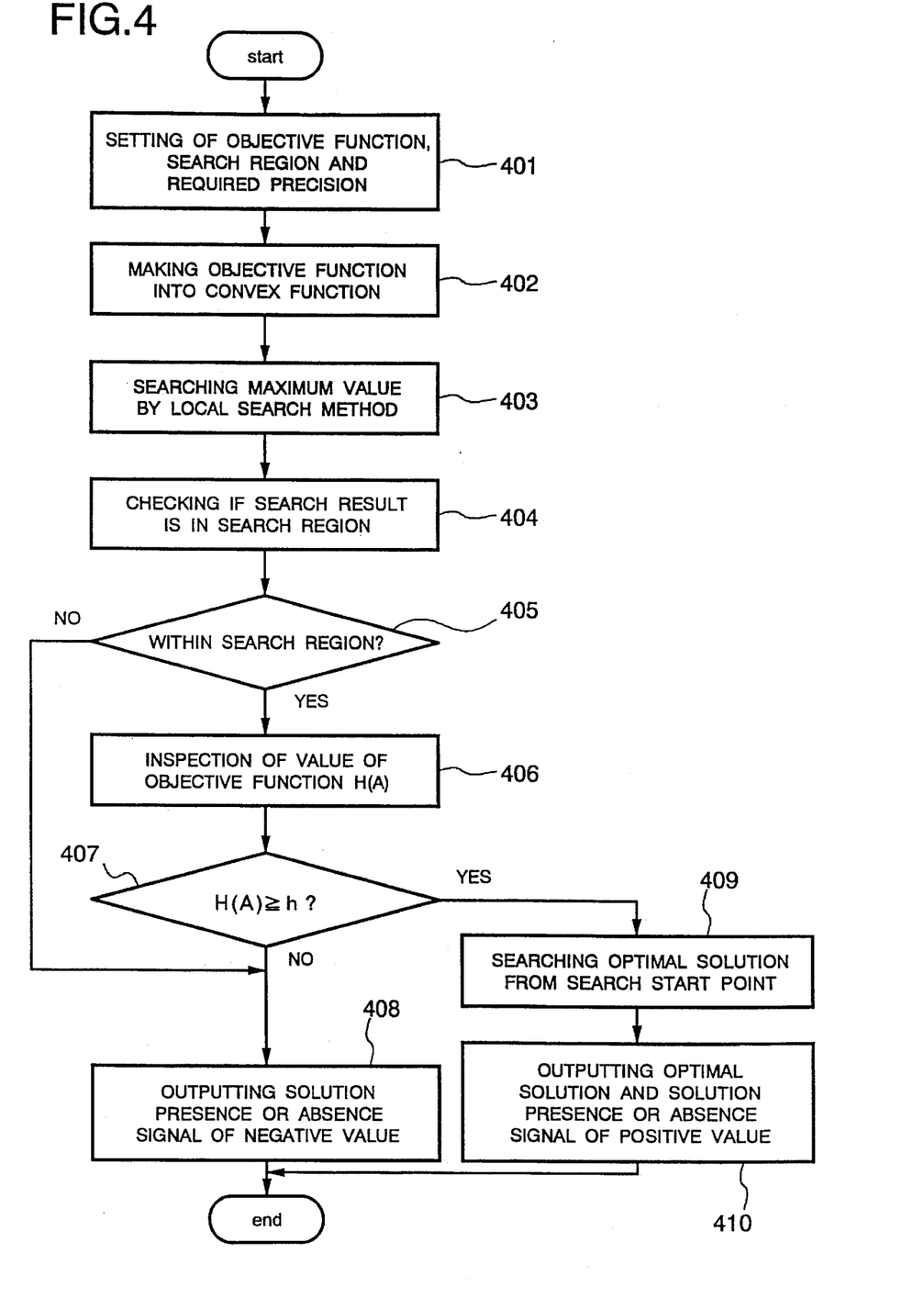
FIG. 4 is a flowchart showing the operation of the second embodiment.

The operation of this embodiment will be described with reference to the flowchart of FIG. 4.

First, the objective function F(A), the required precision and the search region are inputted in the objective function convex section 10 (step 401). The objective function convex section 10 converts the inputted objective function F(A) into a memory group expressing the convex objective function H(A) of the aforementioned numerical formula 2 or the like (step 402); then given to the start point search section 20 together with the memory group expressing the search region.

The optimization section 30 inputs the convex objective function H(A) and the search region from the objective function convex section 10 to search a point that a solution of the convex objective function H(A) becomes a maximum value (step 403). After detecting a point that a solution of the convex objective function H(A) becomes a maximum value, a value of the convex objective function H(A) at that point is determined when the above point is within the search region (steps 404, 405 and 406). When the detected value is less than h or the point that a solution of the convex objective function H(A) becomes a maximum value is present outside of the search region, a negative numerical value indicating no existence of an optimal solution is outputted as a solution presence or absence signal (steps 407, 408). On the other hand, when the detected value of the convex objective function H(A) is h or more and the above point is within the search region, an optimal solution is searched by a local search method such as the conjugate gradient method with a point on the objective function F(A) corresponding to the search start point as a search start position (steps 407, 409). And, a positive numerical value indicating the presence of the optimal solution is outputted as a solution presence or absence signal, and a memory group expressing the detected optimal solution is outputted to the numerical controller or the like (step 410).

Thus, it is judged whether a solution meeting the required precision is present within the search region and, if it is, an optimal solution meeting the required precision can be detected surely and quickly.

Figure 5:
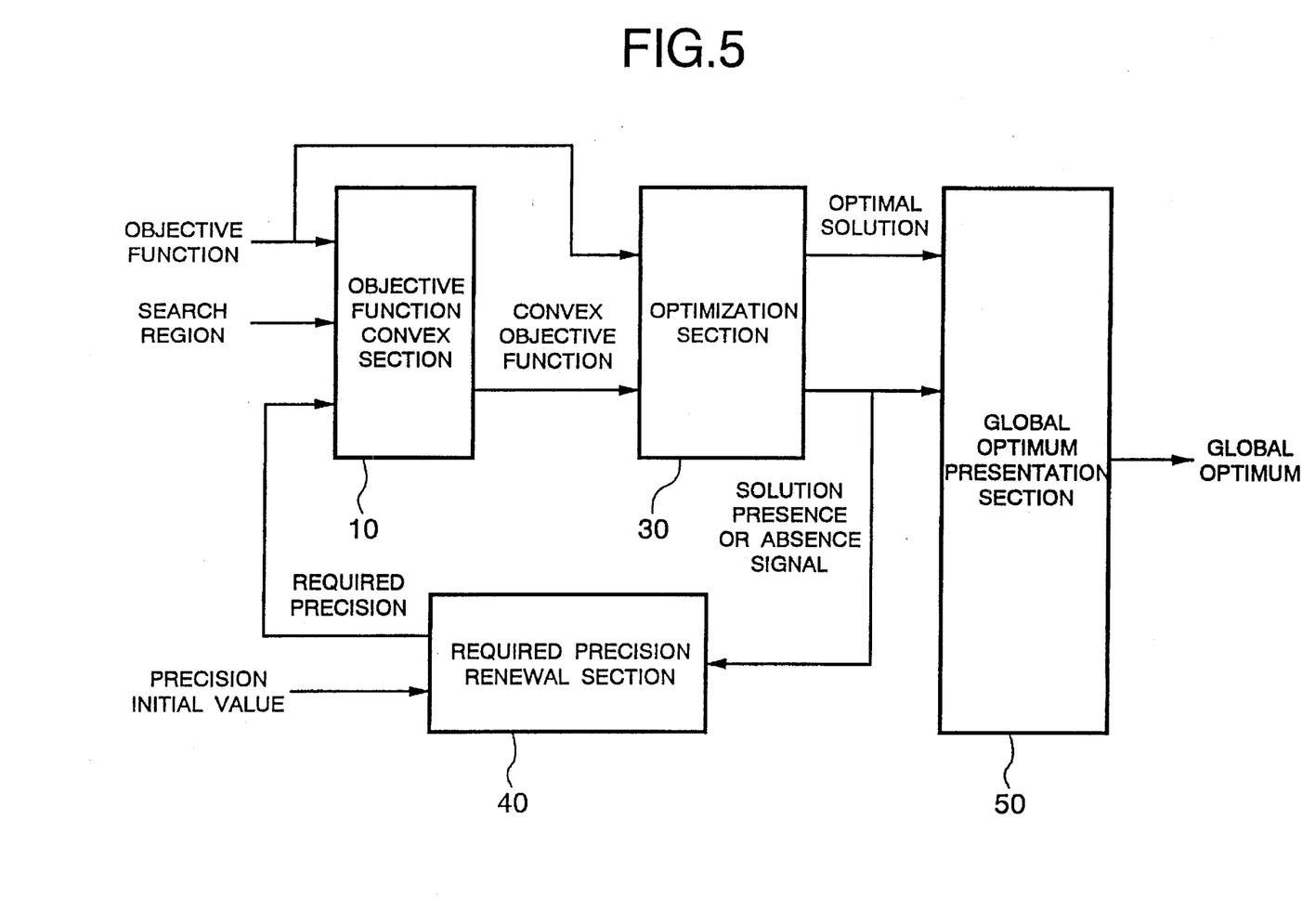
FIG. 5 is a block diagram showing the structure of an optimization device according to the third embodiment of the invention.

FIG. 5 is a block diagram showing a structure of the optimization device according to the third embodiment of the invention.

The drawing shows that the optimization device of this embodiment is provided with an objective function convex section 10 for making an objective function to be optimized into a convex function, an optimization section 30 for searching to detect an optimal solution for the objective function, a required precision renewal section 40 for monitoring the searched result of the optimization section 30 to judge the presence or not of an optimal solution and for feeding back the judged result to set a required precision, and a global optimum presentation section 50 for detecting a global optimum upon receiving the searched result of the optimization section 30 and the judged result of the required precision renewal section 40.

The objective function convex section 10 and the optimization section 30 are same with the objective function convex section 10 in the first embodiment shown in FIG. 1 and the optimization section 30 in the second embodiment shown in FIG. 3, the same reference numerals are used and their description is omitted.

The required precision renewal section 40 inputs a solution presence or absence signal from the optimization section 30 and corrects the required precision according to its value. The required precision renewal section 40 is realized by a CPU or the like of the workstation.

The required precision for obtaining an optimal solution is first assumed to be a large value, or a value that a solution meeting the required precision is present without fail, and gradually made small, so that a global optimum can be obtained as a solution which is finally obtained with the required precision immediately before a solution is eliminated from the search region. And, it is possible that the required precision is first assumed to be a small value, or a value that a solution meeting the required precision never exists, and gradually made large, so that a global optimum can be obtained as a solution which is obtained first in the search region. The following description will be made for simplicity with reference to the case that the required precision is first assumed to be a large value and then gradually made small. But, it is to be understood that the same technique can be applied to the case that the required precision is first assumed to be a small value and then gradually made large.

The global optimum presentation section 50 inputs an optimal solution and a solution presence or absence signal from the optimization section 30, and outputs a global optimum for the objective function based on the above. The global optimum presentation section 50 is realized by a CPU or the like of the workstation.

Figure 6:
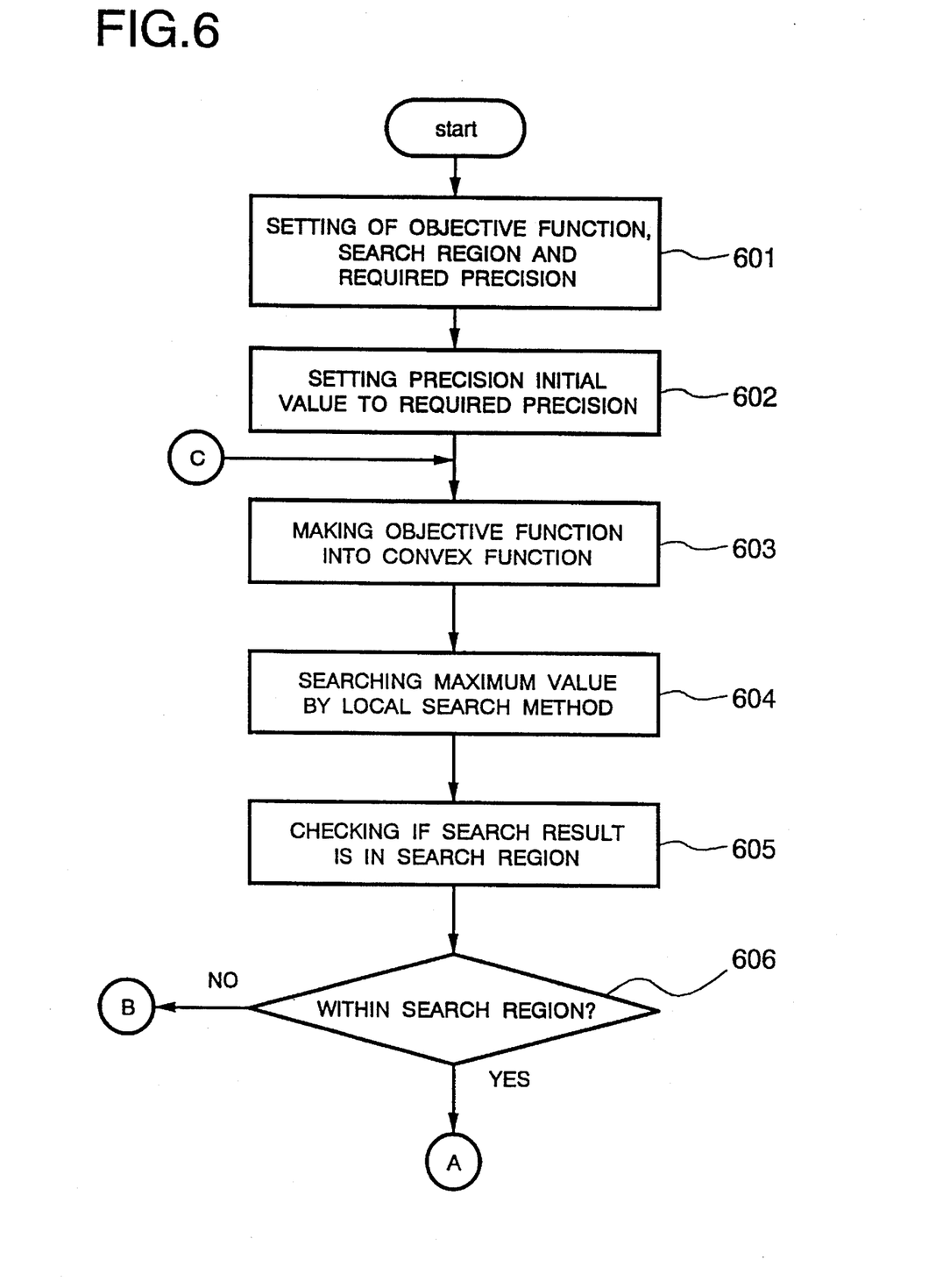
FIG. 6 is a flowchart showing the operation of the third embodiment.
Figure 7:
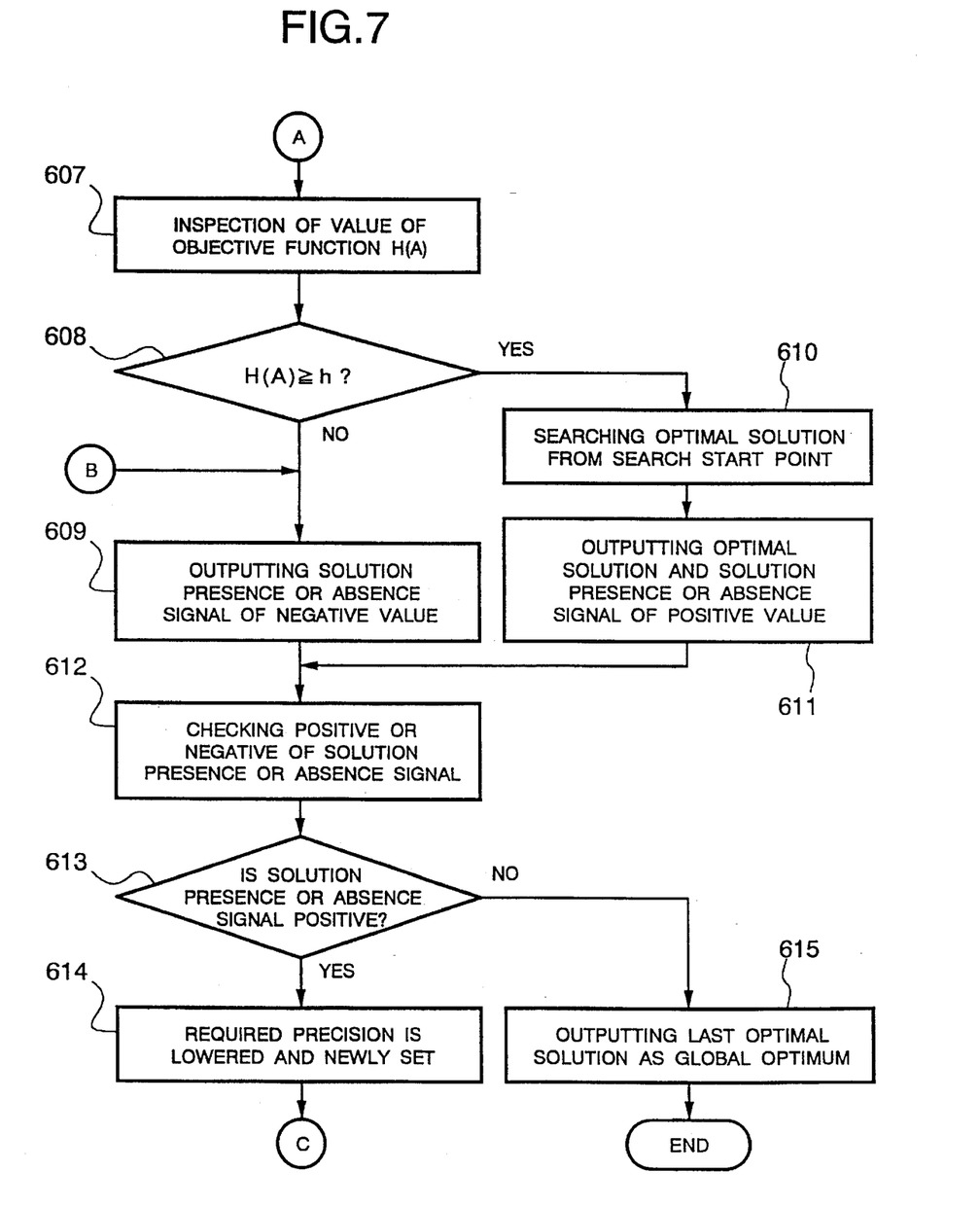
FIG. 7 is a flowchart showing the operation of the third embodiment.

Now, the operation of this embodiment will be described with reference to the flowcharts of FIG. 6 and FIG. 7.

First, the objective function F(A), the required precision and the search region are inputted in the objective function convex section 10 (step 601). The required precision is initially set to a precision initial value to be described afterward (step 602). The objective function convex section 10 converts the inputted objective function F(A) into a memory group expressing the convex objective function H(A) of the aforementioned numerical formula 2 or the like (step 603); then given to the optimization section 30 together with the memory group expressing the search region.

The optimization section 30 inputs the convex objective function H(A) and the search region from the objective function convex section 10 to search a point that a solution of the convex objective function H(A) becomes a maximum value (step 604). After detecting a point that a solution of the convex objective function H(A) becomes a maximum value, a value of the convex objective function H(A) at that point is determined when the above point is within the search region (steps 605, 606 and 607). When the detected value is less than h or a point that a solution of the convex objective function H(A) becomes a maximum value is present outside of the search region, a negative numerical value indicating no existence of an optimal solution is outputted as a solution presence or absence signal (steps 608, 609). On the other hand, when a value of the detected convex objective function H(A) is h or more and the above point is within the search region, an optimal solution is searched by a local search method such as the conjugate direction method with a point on the objective function F(A) corresponding to the search start point as a search start position (steps 608, 610). And, a positive numerical value indicating the presence of the optimal solution is outputted as a solution presence or absence signal, and a memory group expressing the detected optimal solution is outputted to the global optimum presentation section 50 (step 611).

When the solution presence or absence signal inputted from the optimization section 30 is a positive value, or the optimal solution is present, the required precision renewal section 40 reduces the previously outputted required precision by a prescribed value (steps 612, 613 and 614). For the above process, for example, the original required precision can be multiplied by a numerical value of about 0.9. And, the new required precision is outputted to the objective function convex section 10. Another renewal is possible by setting a new required precision at slightly lower value than the detected minimum of the said objective function if the required precision renewal section inputs the detected minimum of the said objective function from the optimization section. In the required precision renewal section 40, a precision initial value is inputted in advance. And, the precision initial value is initially outputted to the objective function convex section 10 as the required precision. The precision initial value is an initial value of the required precision.

When the solution presence or absence signal inputted from the optimization section 30 is a negative value, the global optimum presentation section 50 outputs as a global optimum the lastly inputted optimal solution among the optimal solutions which have been inputted from the optimization section 30 and held (steps 613, 614).

Thus, it is judged whether the search region includes a solution meeting the required precision and, if it includes, the global optimal solution surely meeting the required precision can be detected quickly.

The optimization device described above configures an objective function for checking the acceptability of fitting and controlling of a physical model by expressing in a numerical value a physical control parameter to be optimized, thereby obtaining the best physical parameter by minimizing or maximizing the above objective function. Thus, the optimization device can be applied to various problems such as fitting of a physical model to an observed value and a production plan, classification and anticipation using the above physical model, optimal control of a chemical reaction, and optimal design of a plant.

The application of the optimization device of this invention will be described taking as examples the fitting of a physical model to an observed value and the classification and anticipation using the obtained result.

A certain physical model, Y=f(X, A), will be considered, where Y is a first physical quantity, X a second physical quantity, A a third physical quantity to be optimized, and f(X, A) a relational expression indicating the model.

For example, in a case of a model assuming that a power supply quantity to an electric furnace is X, a temperature of the electric furnace is Y, they are proportional to each other, and their proportional coefficient is an effective specific heat A of the furnace, a physical model is expressed as Y=AX.

When strings (X1, Y1), (X2, Y2), (X3, Y3) and (XN, YN) of N observed results are given, an optimum physical model Y=f(X, A*) is obtained if an effective specific heat A* which describes the observed results strings very well is obtained. And, an optimal solution A* of the effective specific heat in this physical model is quickly detected by each embodiment of this invention.

As described above, this invention can surely judge the presence or not of an optimal solution meeting a required precision even when a search is started from any point in a set search region and, when a solution meeting the required precision is present, an optimal solution meeting the required precision or a global optimal solution can be obtained quickly.

And, in the optimization device applied to realize the fitting of a physical model to an observed value and a production plan, classification and anticipation using the above physical model, optimal control of a chemical reaction, and optimal design of a plant; a guarantee of precision of optimization can improve the precision in settling a production plan, acquiring an optimal model, classifying and predicting observed values, determining control adjusting levels, determining charging amounts of chemical materials and making designs meeting various limited conditions.

Since this invention can surely obtain a solution meeting the required precision, if the optimization process results in failing to obtain a solution meeting the required precision, the cause may be in elements other than the optimization device, e.g., the system structure itself is defective and the required precision cannot be met originally, thus a countermeasure can be taken easily.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An optimization device comprising:

means for inputting an objective function which includes a parameter to be optimized and is an object for searching an optimal solution, a required precision indicating a precision required in searching the optimal solution and a search region for searching the optimal solution for the objective function to make said objective function into a convex function; and means for inputting said objective function made into the convex function to detect a search start point for starting the search of the optimal solution from said search region of the optimal solution.

2. An optimization device according to claim 1, wherein said means for making said objective function into the convex function comprising;

means for having a very large value only at a point where a solution of said objective function is equal to said required precision and for making a prescribed function having a sufficiently small value at other points, and means for giving a diffusing operation to said prescribed function to make the convex objective function.

3. An optimization device according to claim 1, wherein said means for detecting the search start point comprising;

means for determining a maximum value in said search region from the solutions of said convex objective function, means for detecting the position of a point having the maximum value of said convex objective function, and means, when said determined convex objective function value is equal to or above a prescribed threshold value and the point having said maximum value is within the search region, for outputting said point as a search start point.

4. An optimization device comprising:

means for inputting an objective function which includes a parameter to be optimized and is an object for searching an optimal solution, a required precision indicating a precision required in searching the optimal solution and a search region for searching the optimal solution for the objective function to make said objective function into a convex function;

means for inputting said convex objective function to detect a search start point for starting the search of the optimal solution from said search region of the optimal solution; and means for detecting the optimal solution based on the detected search start point.

5. An optimization device according to claim 4, wherein said means for making said objective function into the convex function comprising;

means for having a very large value only at a point where a solution of said objective function is equal to said required precision and for making a prescribed function having a sufficiently small value at other points, and means for giving a diffusing operation to said prescribed function to make the convex objective function.

6. An optimization device according to claim 4, wherein said means for detecting the search start point comprising;

means for determining a maximum value in said search region from the solutions of said convex objective function, means for detecting the position of a point having the maximum value of said convex objective function, and means, when said determined convex objective function value is equal to or above a prescribed threshold value and the point having said maximum value is within the search region, for outputting a point on said objective function corresponding to said point as a search start point.

7. An optimization device according to claim 4, wherein said means for detecting the optimal solution comprising;

means for inputting said objective function, for starting to calculate a value of said objective function from said search start point, and for determining a maximum value or a minimum value in said search region from the solutions of said objective function, means for detecting the position of a point having the maximum value or the minimum value of said objective function, and means, when the point having said maximum value or a minimum value is within the search region, for outputting said point as an optimal solution.

8. An optimization device according to claim 4, wherein said means for making said objective function into the convex function comprising;

means for having a very large value only at a point where a solution of said objective function is equal to said required precision and for making a prescribed function having a sufficiently small value at other points, and means for giving a diffusing operation to said prescribed function to make the convex objective function, said means for detecting the search start point comprising;

means for determining a maximum value in said search region from the solutions of said convex objective function, means for detecting the position of a point having the maximum value of said convex objective function, and means, when said determined convex objective function value is equal to or above a prescribed threshold value and the point having said maximum value is within the search region, for outputting a point on said objective function corresponding to said point as a search start point, and said means for detecting the optimal solution comprising;

means for inputting said objective function, for starting to calculate a value of said objective function from said search start point, and for determining a maximum value or a minimum value in said search region from the solutions of said objective function, means for detecting the position of a point having the maximum value or the minimum value of said objective function, and means, when the point having said maximum value or a minimum value is within the search region, for outputting said point as an optimal solution.

9. An optimization device comprising:

means for inputting an objective function which includes a parameter to be optimized and is an object for searching an optimal solution, a required precision indicating a precision required in searching the optimal solution and a search region for searching the optimal solution for the objective function to make said objective function into a convex function;

means for inputting said convex objective function to detect a search start point for starting the search of the optimal solution from said search region of the optimal solution; and means for detecting a global optimum based on the detected search start point.

10. An optimization device according to claim 9, wherein said means for making said objective function into the convex function comprising;

means for having a very large value only at a point where a solution of said objective function is equal to said required precision and for making a prescribed function having a sufficiently small value at other points, and means for giving a diffusing operation to said prescribed function to make the convex objective function.

11. An optimization device according to claim 9, wherein said means for detecting the search start point comprising;

means for determining a maximum value in said search region from the solutions of said convex objective function, means for detecting the position of a point having the maximum value of said convex objective function, and means, when said determined convex objective function value is equal to or above a prescribed threshold value and the point having said maximum value is within the search region, for outputting said point as a search start point.

12. An optimization device according to claim 9, wherein said means for detecting a global optimum comprising;

means for entering said objective function and starting to calculate a value of said objective function from said search start point to determine a maximum value or a minimum value in said search region from the solutions of said objective function, means for detecting the position of a point having a maximum value or a minimum value of said objective function, means for outputting said point as an optimal solution when a point having a maximum value or a minimum value of said objective function is within the search region, means for repeatedly searching the optimal solution by decreasing a value of said required precision when said optimal solution conforming to said required precision given initially is present, and means for outputting as the global optimum said optimal solution conforming to said required precision immediately before said optimal solution is eliminated.

13. An optimization device according to claim 9, wherein said means for detecting a global optimum comprising;

means for entering said objective function and starting to calculate a value of said objective function from said search start point to determine a maximum value or a minimum value in said search region from the solutions of said objective function, means for detecting the position of a point having a maximum value or a minimum value of said objective function, means for outputting said point as an optimal solution when a point having a maximum value or a minimum value of said objective function is within the search region, means for repeatedly searching the optimal solution by increasing a value of said required precision when said optimal solution conforming to said required precision given initially is not present, and means for outputting as the global optimum said optimal solution conforming to said required precision detecting said optimal solution for the first time.

14. An optimization device according to claim 9, wherein said means for making said objective function into the convex function comprising;

means for having a very large value only at a point where a solution of said objective function is equal to said required precision and for making a prescribed function having a sufficiently small value at other points, and means for giving a diffusing operation to said prescribed function to make said objective function into a convex function, said means for detecting the search start point comprising;

means for determining a maximum value in said search region from the solutions of said objective function made into the convex function, means for detecting the position of a point having the maximum value of said objective function made into the convex function, and means, when said determined objective function value made into the convex function is equal to or above a prescribed threshold value and the point having said maximum value is within the search region, for outputting said point as a search start point, and said means for detecting the global optimum comprising;

means for entering said objective function and starting to calculate a value of said objective function from said search start point to determine a maximum value or a minimum value in said search region from the solutions of said objective function, means for detecting the position of a point having a maximum value or a minimum value of said objective function, means for outputting said point as an optimal solution when a point having a maximum value or a minimum value of said objective function is within the search region, means for repeatedly searching the optimal solution by decreasing a value of said required precision when said optimal solution conforming to said required precision given initially is present, and means for outputting as the global optimum said optimal solution conforming to said required precision immediately before said optimal solution is eliminated.

15. An optimization device according to claim 9, wherein said means for making said objective function into the convex function comprising;

means for having a very large value only at a point where a solution of said objective function is equal to said required precision and for making a prescribed function having a sufficiently small value at other points, and means for giving a diffusing operation to said prescribed function to make said objective function into the convex function, said means for detecting the search start point comprising;
means for determining a maximum value in said search region from the solutions of said objective function made into the convex function, means for detecting the position of a point having the maximum value of said objective function made into the convex function, and means, when said determined objective function value made into the convex function is equal to or above a prescribed threshold value and the point having said maximum value is within the search region, for outputting said point as a search start point, and said means for detecting the global optimum comprising;
means for entering said objective function and starting to calculate a value of said objective function from said search start point to determine a maximum value or a minimum value in said search region from the solutions of said objective function, means for detecting the position of a point having a maximum value or a minimum value of said objective function, means for outputting said point as an optimal solution when a point having a maximum value or a minimum value of said objective function is within the search region, means for repeatedly searching the optimal solution by increasing a value of said required precision when said optimal solution conforming to said required precision given initially is not present, and means for outputting as the global optimum said optimal solution conforming to said required precision detecting said optimal solution for the first time.

16. An optimization method comprising:

a step for inputting an objective function which includes a parameter to be optimized and is an object for searching an optimal solution, a required precision indicating a precision required in searching the optimal solution and a search region for searching the optimal solution for the objective function to make said objective function into a convex function;

a step for inputting said convex objective function to detect a search start point for starting the search of the optimal solution from said search region of the optimal solution, and a step for detecting the optimal solution based on the detected search start point.

17. An optimization method according to claim 16, wherein said step for making said objective function into the convex function including;

a step for having a very large value only at a point where a solution of said objective function is equal to said required precision and for making a prescribed function having a sufficiently small value at other points, and a step for giving a diffusing operation to said prescribed function to make the convex objective function, said step for detecting the search start point including;
a step for determining a maximum value in said search region from the solutions of said convex objective function, a step for detecting the position of a point having the maximum value of said convex objective function, and a step, when said determined convex objective function value is equal to or above a prescribed threshold value and the point having said maximum value is within the search region, for outputting said point as a search start point.

18. An optimization method according to claim 16, wherein said step for detecting the optimal solution including;

a step for inputting said objective function, for starting to calculate a value of said objective function from said search start point, and for determining a maximum value or a minimum value in said search region from the solutions of said objective function, a step for detecting the position of a point having the maximum value or the minimum value of said objective function, and a step, when the point having said maximum value or a minimum value is within the search region, for outputting said point as an optimal solution.

* * * * *